US008307602B2

(12) United States Patent
Cochran, Jr.

(10) Patent No.: US 8,307,602 B2
(45) Date of Patent: Nov. 13, 2012

(54) GRATE SUNSHADE

(76) Inventor: Horace J Cochran, Jr., Burr Ridge, IL (US)

( * ) Notice: Subject to any disclaimer, the term of this patent is extended or adjusted under 35 U.S.C. 154(b) by 412 days.

(21) Appl. No.: 12/584,471

(22) Filed: Sep. 4, 2009

(65) Prior Publication Data

US 2011/0056135 A1 Mar. 10, 2011

(51) Int. Cl.

| | |
|---|---|
| ***E06B 3/32*** | (2006.01) |
| ***E06B 3/48*** | (2006.01) |
| ***E06B 3/964*** | (2006.01) |
| ***E04C 2/38*** | (2006.01) |
| ***E04C 2/42*** | (2006.01) |
| ***G02B 5/18*** | (2006.01) |
| ***G02B 27/00*** | (2006.01) |

(52) U.S. Cl. .... 52/656.8; 160/113; 160/104; 52/204.61; 52/660; 359/566; 359/592; 359/596

(58) Field of Classification Search ............... 52/204.61, 52/786.11, 656.8, 660, 663, DIG. 17, 200, 52/202; 359/591, 592, 593, 594, 595, 596, 359/597; 160/104, 113

See application file for complete search history.

(56) References Cited

U.S. PATENT DOCUMENTS

| | | | | |
|---|---|---|---|---|
| 719,065 | A * | 1/1903 | Wadsworth | 359/596 |
| 2,689,387 | A * | 9/1954 | Carr | 160/90 |
| 3,059,537 | A * | 10/1962 | Walli | 359/596 |
| 3,077,643 | A * | 2/1963 | Horner | 52/473 |
| 3,220,065 | A * | 11/1965 | Graham | 49/67 |
| 3,438,699 | A * | 4/1969 | Seeger | 359/596 |
| 3,642,557 | A * | 2/1972 | Warp | 359/596 |
| 4,035,539 | A * | 7/1977 | Luboshez | 428/178 |
| 4,335,551 | A * | 6/1982 | Benkelman et al. | 52/200 |
| 4,577,619 | A * | 3/1986 | Howe, Jr. | 126/629 |
| 5,388,000 | A * | 2/1995 | Bartenbach | 359/596 |
| 5,587,847 | A * | 12/1996 | Chang et al. | 359/890 |
| 5,689,930 | A * | 11/1997 | Anderson | 52/786.11 |
| 5,701,939 | A * | 12/1997 | Pinto et al. | 160/84.01 |
| 6,014,845 | A | 1/2000 | Jain | |
| 2005/0011145 | A1* | 1/2005 | Mayer et al. | 52/200 |
| 2009/0049770 | A1* | 2/2009 | Konstantin | 52/200 |
| 2009/0288353 | A1* | 11/2009 | Barsby et al. | 52/202 |
| 2010/0212238 | A1* | 8/2010 | Voegele et al. | 52/204.595 |

* cited by examiner

*Primary Examiner* — Joshua J Michener
*Assistant Examiner* — Ryan Kwiecinski

(57) ABSTRACT

An energy saving grate installed outside a building or structure in warm weather that reduces heating due to infrared radiation (IR) from sunlight. For a window application the grate acts as a sunshade to block or diffuse the IR and ultraviolet (UV) portions of sunlight while passing visible light. The grate cell size, depth, cell surface characteristics, and mounting details near the sash determine system performance of sunlight control, of the view through the grate, and of the exterior appearance. The grate is removable for cool weather. The grate system can cool various surfaces and requires no operating adjustments. It can be applied near most windows (including skylights) on all sides of a building where impinging sunlight causes unwanted heating. Compared to external solar thin mesh screens the grate system can provide more open area for a given performance in reduced IR heating.

5 Claims, 6 Drawing Sheets

View 1A – 1A

View B1

View B2

View B3

GRATE SUNSHADE

This invention saves electric usage for air conditioning or fans by reducing infrared (IR) heating from sunlight. An egg crate style grate is mounted outside a building and blocks or diffuses or absorbs sunlight. Less incident IR then enters through the building window while substantial visible light passes into an interior space. Hence the grate performs as a selective sunshade when oriented at or near a functional angle.

CROSS REFERENCE TO RELATED APPLICATIONS

1) No related applications
2) References cited:

| U.S. Pat. No. | Date | Name |
|---|---|---|
| 6,014,845 | January 2000 | Jain |
| 3,220,065 | November 1965 | Graham |
| 5,701,939 | December 1997 | Pinto |
| 2005/0011145 | January 2005 | Mayer |
| 2009/0288353 | November 2009 | Barsby |

STATEMENT OF FEDERALLY SPONSORED RESEARCH

Not applicable.

REFERENCE TO COMPUTER LISTINGS

Not applicable.

BACKGROUND OF THE INVENTION

1) Field of the Invention

This invention is for blocking and diffusing sunlight outside of a window or skylight or door or other surface that would benefit from reduced infrared heating (especially from but not limited to sunlight). The sunlight control and resulting energy savings occur while a view through the window is maintained. Although the invention may commonly be said to create a shading effect, the invention is not merely providing SHADE. Shade is the blockage of sunlight and the shading object can be quite a distance from the target surface. (The moon shades during an eclipse of the sun). As desirable as dense shade is for IR blockage, because of its shape and distance to the target, the shade may only last for a short time as the sun progresses across the sky. A grate near a window, however, produces a different mix of visible light and can be more efficient at reducing IR heating over the course of the daylight hours.

For a window application, a grate can be mounted to the building or to the window frame, or to the sash. It can also be deployed as a shutter or shutter insert. It can be deployed as an awning or awning insert. For a skylight it can additionally be laid on the windowpane and constrained so as to stay on the frame assembly. For East or West facing windows or where a functional angle is difficult to achieve with standard mounting near parallel to the windowpane, a slant type grate can be used to more effectively block direct sunlight while admitting diffused visible light. Alternatively, for East or West facing windows the cell depth can be increased both to achieve a functional angle for more time during the day and to increase IR absorption. Grates are typically installed during warm months when the air conditioner is active and stored in cooler months when the air conditioner is dormant.

Because an installed grate changes the appearance of a window from outside the building, a thin (such as 0.06 to 0.09") sheet of acrylic can be installed on the outside of the grate. This restores a reflective surface to the window.

For all embodiments, ultraviolet light (UV) is also blocked, absorbed, or diffused by the grate and this may reduce problems with fading of materials inside the building but this is not the focus of the invention.

2) Statement of Problems and Related Art

Occupants of a building or structure have multiple desires from windows. This includes a good view (from either side), low initial cost, minimal operating adjustments required, favorable impact on heating and cooling costs, good appearance, and the ability to admit desirable sunlight wavelengths while blocking undesirable wavelengths. For well insulated and sealed houses, the largest winter heat loss per area is through the many windows and the largest summer daytime heating is through those same windows. That summer heat in turn creates peak demands for air conditioning and for the Utility. The following methods are options for enhancing window performance:

a) Internal curtains and blinds. These are part of the interior decor and control visible light while providing privacy. Blinds can reflect some IR back outside when the blinds are closed and the view is obscured, but this requires occasional adjustment and produces only a slight reduction in cooling costs. An improvement to blinds is the collapsible shade documented in U.S. Pat. No. 5,701,939. The shade blocks direct sunlight from impinging other interior surfaces.

b. Awnings. These are external sunshades and the structure is sometimes collapsible. The awning typically has a solid sheet or mesh screen as a covering and working surface. Awnings are mounted a distance from the windowpane to allow a view around the awning. If the awning is large enough to fully shade a window for all day it would detract from the view, appearance, and initial cost objectives. Awnings are best retracted or removed and stored out of season.

c) Screens. Of interest here are sunscreens. Insect screens provide little shade. Although a screen can be a perforated sheet it is usually a thin woven mesh of metal or fiber. The mesh can be installed on a fixed or variable frame or on no frame at all for rollup versions. Screens have low initial cost for the mesh itself and when mounted externally, provide shade in inverse proportion to the open area of the weave. The view through a screen is partially obscured so there's a tradeoff Open meshes are easier to see through but block less IR and other wavelengths.

d) Shutters. When installed outside the building, a shutter blocks summer sunlight. A common design involves louvers and the view is limited. Internal shutters exist, often with adjustable louvers, but inside shutters allow the IR inside and only mildly reduce cooling costs.

e) Architectural overhangs. These function like awnings and are helpful in blocking direct sunlight in summer while passing it in winter. Overhangs are permanent structures and add to the cost of the building. They are rarely added after initial construction.

f) Film applied to the windowpane. Some films are more selective to IR blockage than others. If a film blocks IR in warm weather months but remains in place all year it detracts from desirable winter heating by sunlight. If so, the economic benefits in summer are eroded. Films commonly have some darkening effect on the interior and some of the visible light is rejected.

g) Blinds between the double panes. This design is effective in blocking some IR before it reaches the room interior. The blinds can be adjusted manually to provide variable light attenuation, a variable appearance, and a variable view. IR absorbed by the blinds heats the median space between the panes. Additionally, because the blinds are a collection of horizontal slats they allow some sunlight to penetrate from the sides.

h) Diffraction grates. Light entering perpendicular to the plane of the grate has visible wavelengths passed while reducing IR passed. As the seasons change and the sunlight approaches from a more shallow angle, both are favorably passed (U.S. Pat. No. 6,014,845 Jain). The application is especially useful for skylights and the diffraction grate can be removed for winter.

i) Other methods: Chromogenic coatings, shade trees, free standing solar filters of perforated sheet, low transmittance glass, and solid shutters.

Functional Angle Defined. The functional angle is used to orient the grate with respect to the window and the position of the sun to optimize the performance and the mounting. The easiest way to determine a functional angle is to hold the grate in the sunlight while observing the shadow cast. If the grate plane is perpendicular to the sun only a faint shadow will result. As the grate is tilted and rotated, the observer will note a definite grid or waffle pattern of light and shadow. Further manipulation will cause the light portion of the pattern to diminish. When the pattern is at the transition point from a mix of light and shadow to all shadow, this establishes a functional angle for that place and time. Because of the three dimensional nature of the grate, there will be multiple solutions for a functional angle and this is beneficial once the grate is installed in a fixed position near a surface to be protected from IR heating.

Open Area Defined. In the plane of the grate, the open area is that portion not occupied by the structure of the grate. The percent open area is: Open area/Total area. A solid grate with cell structure filled would have no open area.

PROTOTYPE EMBODIMENT

Solid or full shade means total blockage of IR from sunlight (of course, black body radiation from the surroundings still occurs) and if it is maintained throughout the day and without blocking the view, represents the ideal case for a sunshade. The prototype herein has been shown to substantially reduce energy costs. Those skilled in the art will appreciate that various mounting methods and grate manufacturing methods are possible within the scope of the invention. In developing a prototype, various grate depths were used. The depth can be used to achieve a functional angle through some or all of daylight hours. Naturally, East and West surfaces as well as skylights experience different angles to the sun versus a South facing application. For simplicity and economy a prototype was developed using cut rectangular pieces from commonly available egg crate style grate stock (Ex: 2'×4'×3/8", 1/2"×1/2" cell size). The pieces were lashed with nylon straps to the size of the window sash. The subassembly was then stacked with a like mate to form a grate assembly of double depth (5/8 to 3/4") or triple depth for testing and evaluation. The stack was aligned and secured using 1/2" square dowel. (An alternative method would be to cast the desired depth into the grate mold at the manufacturer.) The double stack was framed with 5/8" J-molding to form a frame. Sheet metal screws secured the J-mold to the grate assembly, anchored at the dowel positions. The resulting grate is about 75-80% open area and is flexible enough to aid installation and removal at the sash but strong and rigid enough to maintain its shape while resisting wind or other damage. The prototype mounting used "L-screws" (#112). These were anchored either in the sash frame or the window frame. The grate was constrained but not fastened hard. The L-screws could be rotated so that the base of the L passed either just aside the grate frame or through the cell diagonal during installation. The L-screw was then rotated again to retain the grate in place.

The preferred embodiments of the invention are indicated by the following:

a) Grate size: about the window sash size, depending on installation method.

b) Grate description:

grate with 0 degree slant angle cell size nominal 1/2" square cell depth abut 5/8" for south facing windows; about 5/8" to 1 1/8" for East or West facing windows or skylights (deeper cells absorb more but add to weight and cost)

c) Transparent acrylic external cover (optional), thickness 0.06 to 0.09" for normal window sizes. (Thin without tearing, cracking, or causing reflection distortion.)

d) Slant cell: (optional) about 1/2' to 5/8" square, slant angle about 45 degrees e) Open area: greater than 50% in the grate plane.

SUMMARY OF THE INVENTION

The object of this invention is to provide a selective IR screen in summer months for windows (and other surfaces) while still providing a view through the window. A grate mounted near the windowpane and covering some or all of the pane protects the window during all or much of the daylight hours where sunlight impinges the grate. The building or structure interior is washed with a good amount of indirect and diffused visible light.

An advantage of the invention is the automatic shadowing (while maintaining a view) despite the sun's changing incidence angle with respect to the horizon and with respect to the window.

A feature of the invention is a removable system that performs well while installed and during air conditioning season yet stores well so that solar heating during cool months is uninhibited.

Another feature of the invention is a grate surface that is selective and one that may be coated to further enhance its selectivity. Coatings include pigments (especially black), or other IR selective coatings.

Another advantage of the invention is a design that can be adapted to all windows of a building or structure that are impinged by direct sunlight. Each grate can be of tailored depth to extend the duration of the grate effect. Grates covering all or part of a sash are included.

Another feature of the invention is an embodiment wherein the grate is formed with a cell slant angle. This enhances performance for some skylights and East and West facing applications.

Another feature of the invention is a grate with cell walls wherein both the horizontal walls and vertical walls are working surfaces, unlike most blinds, slats, and louvers that have working surfaces along one plane but very little working surface perpendicular to that plane. This feature helps the grate to absorb, diffuse, or pass sunlight selectively and automatically as the sun completes its arc across the sky.

Another advantage of the invention is a grate that provides some of its saving and cooling benefits even when operating at less than a functional angle.

Another feature of the invention is the embodiment of mounting a grate as a shutter or inside a shutter shell. This allows storage of the grate in situ and allows the grate to move from the installed position to the inactive position without being removed.

Another advantage of the invention is a method for assembling grate segments for a wide variety of window heights and widths. This is an alternative to cutting a grate to size from larger sheet stock.

Another advantage of the invention is application to a wide variety of orientations to the sun as well as to building types, structures, and movable structures. The invention is adaptable especially to planar or near planar windows including a double hung style. A non-planar window may be protected with grate segments configured near parallel to the curved surface tangent. Examples of movable structures include boats, barges, trailers, and recreational vehicles.

Another feature of the invention is an embodiment wherein the grate is covered on its exterior plane by a transparent sheet (such as acrylic). The transparent sheet creates a more window-like appearance to observers outside the building but adds to the initial cost and weight of the embodiment. Thin opaque plastic strips sandwiched between the sheet and the grate can be used as ornamentation to simulate a multi-paned colonial appearance.

Another feature of the invention is an embodiment wherein the grate cell geometry contains an elongated horizontal dimension compared to the vertical extending the angle of the view (at grade) through the grate and moderating the exterior appearance by making it appear more open through a greater arc of viewing.

Another advantage of the invention is a sunshade grate that intercepts sunshine at the windowpane but does not itself need to extend beyond the window frame to accomplish this.

Another feature of the invention is an embodiment with mounting hardware that permits installation and removal of the grate from inside the building through an open sash. The grate is passed through the open window and slid in a channel fashioned for this purpose with hardware. This method is useful for multi-story building applications.

Another advantage of the invention is a sunshade grate that can be adapted to a variety of window types including casement (opening outward or inward), fixed, double hung, and multiple hinged.

Another advantage of the invention is a grate that can be manufactured using commonly available materials in the retail trade.

Another feature of the invention is a paintable grate. This is useful in maintaining the grate coloring and light controlling characteristics. The paintable grate is also useful for non-window applications where paint can be used to complement the color or texture of the surface being protected. Non-window examples include doors, tank vessels, walls, roofs, coverings (made of materials such as wood, plastic, or metal), and air conditioner compressor housings.

Another feature of the invention is a sunshade grate where the percent open area generally exceeds 50%. With the grate mounted close to the window, it is sheltered from wind and other threats. With its open area, wind gusts have little sail area or purchase for perturbing or damaging the installed grate.

Another feature of the invention is a grate whose depth can be increased by stacking and securing added layers to the originally manufactured grate depth.

Another feature of the invention is an embodiment where a grate is installed on the outside of a window having an insect screen present on the interior side of the sash. The screen is held in a screen seat portion of the interior window frame. A reflective film is loosely mounted on the insect screen next to the sash and sealed between the insect screen's own frame and the screen seat of the window frame. By this means, IR or UV light initially passing the grate and the window can be reflected, thus further reducing their effect on the interior where diminished visible light and ventilation is allowable.

Another advantage of the invention is the variety of materials that can be used in the manufacture of the grate. Examples include but are not limited to plastics, polystyrene, acrylics, and lightweight metals such as aluminum.

Another feature of the invention is alternate grate cell structures versus those commonly available as homogeneous solid, molded structures. Cell walls may also be textured, coated, perforated, or porous. They may contain imbedded materials to enhance heat transfer to release captured IR energy to the surroundings.

Another feather of the invention is a non-homogeneous grate made up of layers parallel to the plane of the grate where each layer is optimized for its position in the grate assembly. An example is a two-layer assembly where the inner layer is optimized for sunlight control and the outer layer is modified to enhance the exterior appearance.

Another feature of the invention is a shutter assembly incorporating a grate. In the stored position, the grate may be visible if exposed or not visible if garaged in a protective shutter shell. In the shell embodiment the shutter assembly could be made (in the stored position) to closely resemble traditional shutter designs.

Another feature of the invention is the option to install the grate without a frame. This is useful both for some light grates with short depth and for window frames that are curved or irregular in shape. In this embodiment the grate serves as its own frame.

Another feature of the invention is an embodiment where the grate is part of an awning system that places the grate into a position where it can protect a window or other surface during daylight hours. The awning is retracted or removed after summer.

Another feature of the invention is a hybrid option where a small awning is installed to handle the upper portion of a window and provide a clear view through part of the window. This is coupled with a grate installed near the lower portion of the windowpane where the view may be less critical.

SUMMARY OF DRAWINGS

The accompanying drawings supplement the written specification and illustrate an example of the invention, as follows.

CONTENTS OF DRAWINGS

Figure 1:
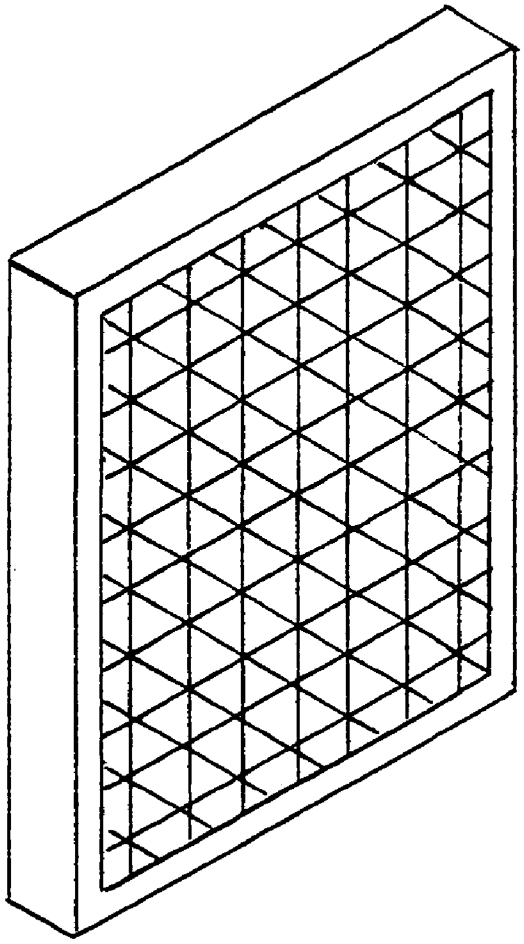
FIG. 1 is an assembly drawing of a grate for mounting outside a window to save electricity for air conditioning.

1) FIG. 1: A grate. The egg crate structure of cells is encased in a frame.

Figure 2:
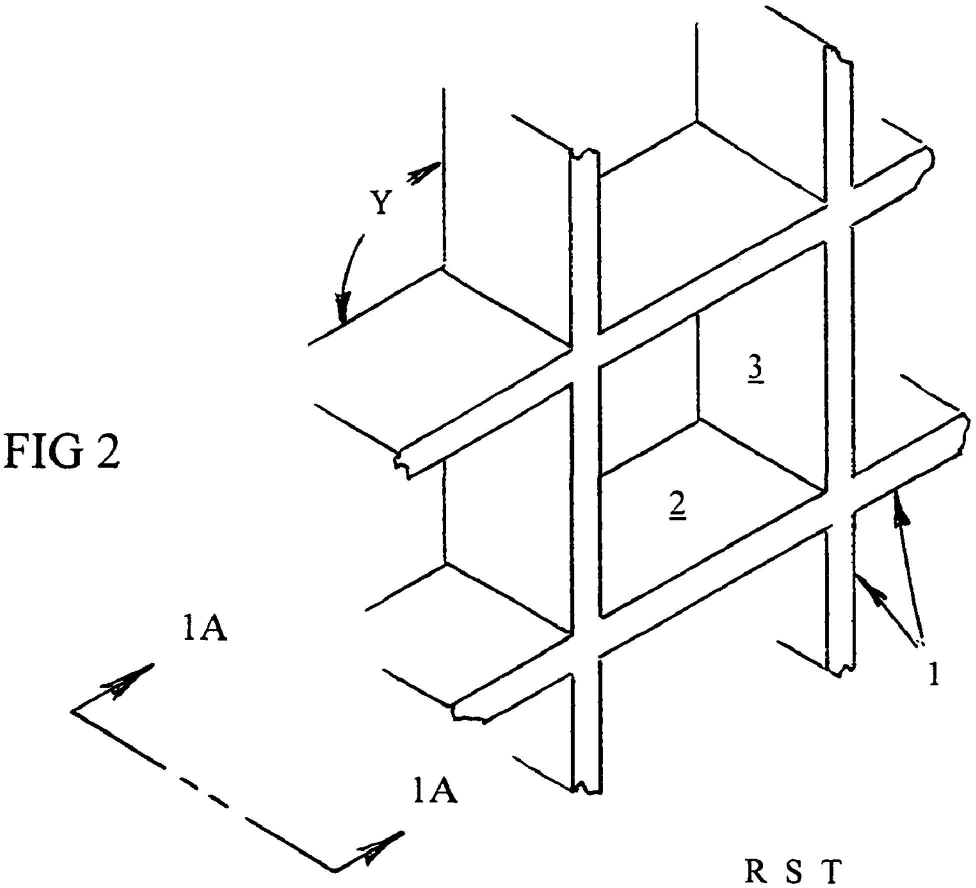
FIG. 2 is a cutout grate schematic showing cell walls that selectively absorb infrared (IR) while passing visible light (VL).

2) FIG. 2: Typical Grate Cell. The cutout shows cell walls (2,3), face (1), and slant angle Y.

Figure 2A:
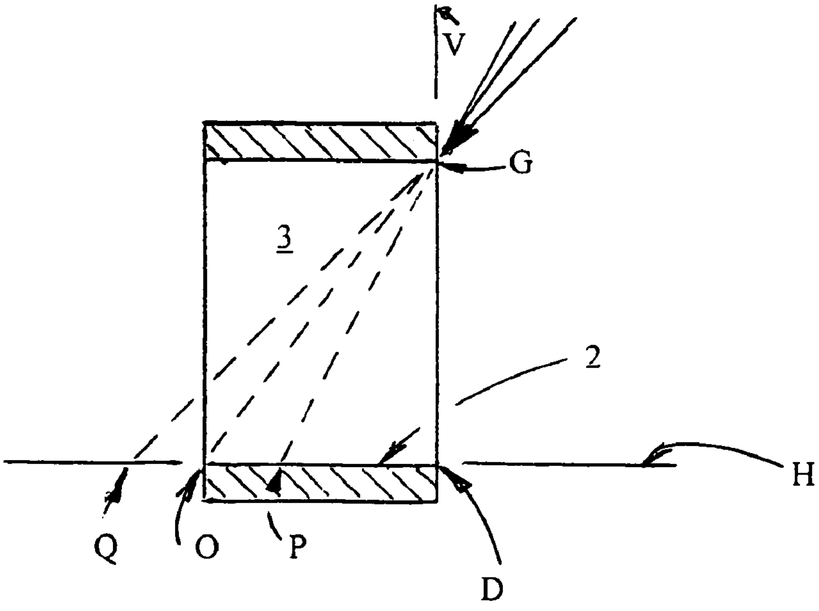
FIG. 2A is a section view of FIG. 2 showing the geometry of light impinging on a grate.

3) FIG. 2A: View 1A-1A is a cross-section view and demonstrates the impingement angle of sunlight to the grid as well as demonstration of "a functional angle". At a point of time sunrays are assumed to arrive in parallel. Also, light diffuses in many directions and so diffused rays are not shown for simplicity.

TABLE-US-00002 Legend Interpretation 1 Grate face 2 Horizontal cell wall (assumes a vertical window pane) 3 Vertical cell wall (assumes a vertical windowpane) (RG, SG, TG) Sunrays at different times of day Q Where sunlight TG has passed the grate and is part of a shadow pattern (O,P,Q,G) Impingement points of sunlight VGD Plane of the grate reference HQ Horizontal reference for a vertical windowpane (SOH, RPH, TQH) Angle of impingement for various sunrays over time SOH A functional angle RPH Greater than a functional angle TQH Less than a functional angle Y 90-degree cell wall (slant angle=0 degrees) OD depth of the grate.

Sunlight approaches from the upper right in FIG. 2A. The grate is mounted so as to create a shadow on the windowpane and the interior. If the grate were a perfect reflector of all sunlight wavelengths, essentially all incident sunlight would pass to the interior and the grate would provide little benefit compared to an uncovered window. Conversely, if the grate were a perfect absorber of all sunlight frequencies, only indirect light and direct light not impinging the grate would be passed to the interior. Sunlight IR reduction would be complete as long as the grate operated at or greater than a functional angle. In fact, however, the grate is an imperfect absorber, diffuser, and reflector.

When RG is shining it just passes G and arrives at P, not directly reaching the interior. At P on a working surface OD, impinging light can refract into the translucent grate structure, it can be absorbed, it can reflect, or it can diffuse. Since blue light reflects better than red light, the grate selectively passes visible light while reducing the passage of longer wavelengths.

The depth of the grate is doing more than just making it difficult for direct sunlight to penetrate the grate. When sunlight impinges a working surface OD and diffuses, it generally proceeds toward the interior. The path it must follow is defined by the cell structure. The deeper the structure, the more opportunity for diffused light to impinge a working surface a second time. For grate depths greater than 1.5" (OD>3 times DG) and for sunlight at about functional angle plus 30 degrees, the IR approaches the full shade condition owing to its absorption along the deep cell wall channels.

When SG is shining it just passes G and arrives at O. No direct light reaches the interior but any further decrease in angle will allow direct sunlight to pass. Naturally, rays parallel to SG are shining at the same time and would impact a working surface such as at P. When TG is shining the sunlight arrives at a small enough angle TQH to allow some direct sunlight to pass the grate and window and enter the interior. The resulting shadow pattern will be a waffle grid of light and shadow on an interior surface. At this point the grate is still working (some of the parallel rays still impinge at P) and providing a portion of the desired effect. From this one can also see the critical nature of the ratio GD:OD. The depth OD can be increased both to extend the time sunlight remains at or greater than a functional angle and to lengthen the channel formed by the cell walls (2,3) along its depth. If one were to increase GD to alter the exterior appearance of the grate, the depth would have to also increase in order to maintain grate performance. This could add to grate weight, cost, and mounting problems. If a horizontal sectional cut is made, similar tradeoffs can be shown for sunlight entering from the side instead of overhead. If one were to decrease GD, to reduce cost OD could also decrease but the cell count would increase and the open area would decrease. The cell wall thickness could also be reduced to increase the open area and reduce grate weight but at the expense of less grate rigidity and resistance to damage.

Figure 3:
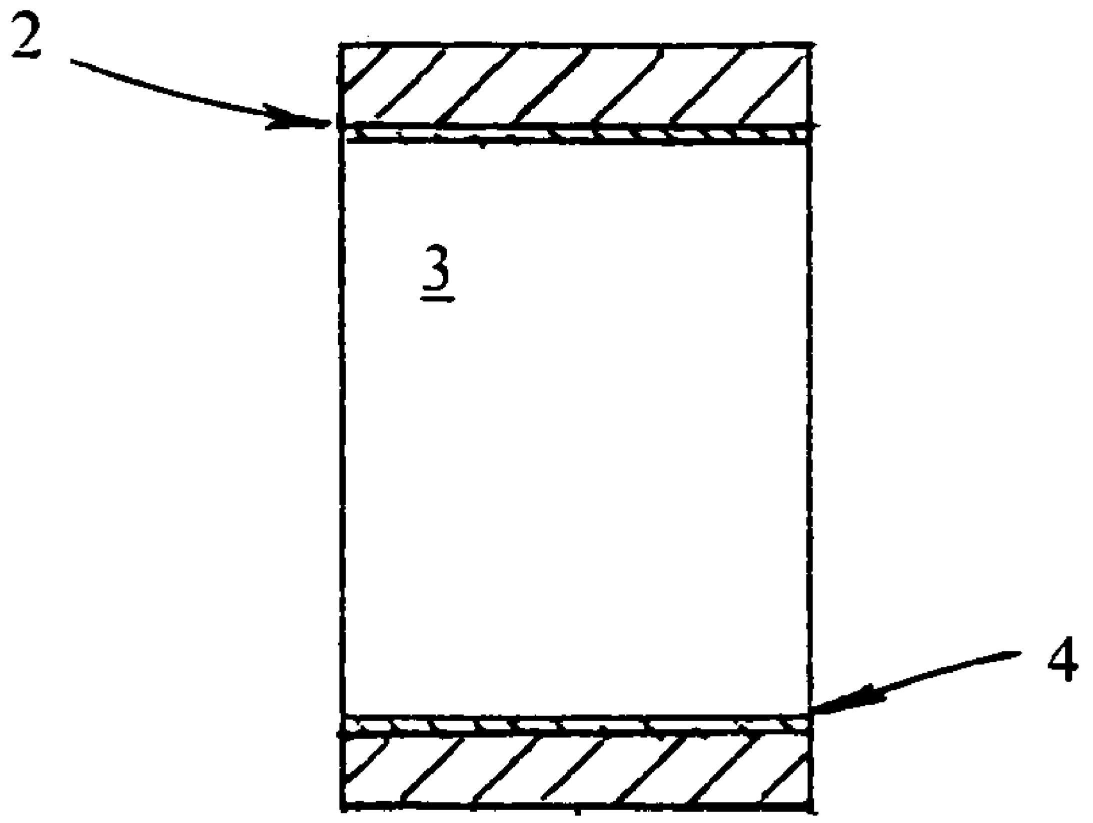
FIG. 3 is a sectional view of a cell showing an embodiment with a coating on the cell walls.

4) FIG. 3: The sectional view shows a coating layer 4 applied to cell wall 2. The coating may cover all or a portion of the cell walls in a grate. The coating has the property of selectively absorbing IR and passing visible light (VL).

Figure 4:
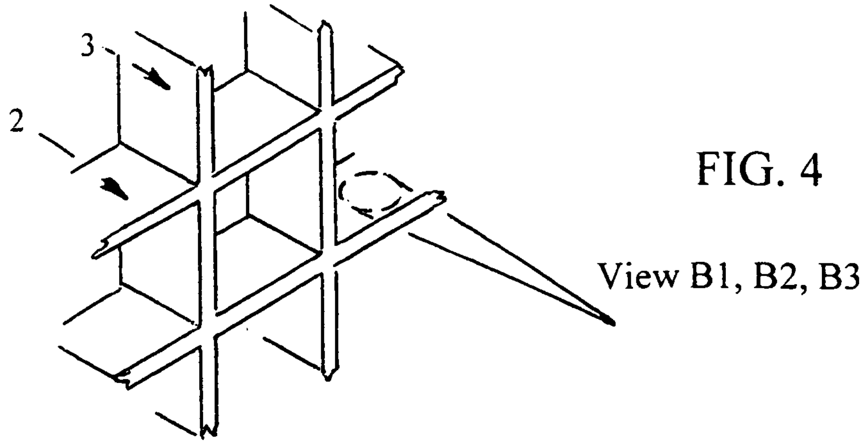
FIG. 4 is a cutout grate schematic highlighting the cell surface for an embodiment with cell surface modification.

5) FIG. 4: The schematic cutout view shows cell wall (2) surface highlighted.

Figure 4A:
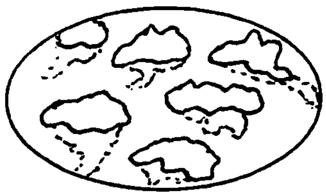
FIGS. 4A, 4B, and 4C are detail views showing example cell surface modifications of a cell wall to enhance selectivity of sunlight so as to preferentially block IR according to the invention.
Figure 4B:
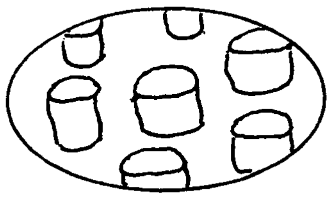
Figure 4C:
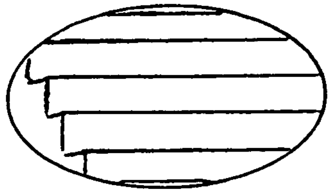

6) FIG. 4 A-C: Detail drawings showing how modification such as porosity or texture in the cell wall surface can produce more opportunities for light diffusion and reflection. In FIG. 4A, cell surface (2) has been made porous. The porosity appears as holes in the surface (2) with micro channels penetrating into the wall structure. This porosity creates sites for impinging light to enter. In the porous cavities, light experiences more reflections than would be the case for a smooth surface and selective reflectivity means more IR is preferentially absorbed while VL is passed out to the cell or through (if translucent) the cell wall. FIG. 4B shows a studded surface modification to the cell wall (2). In this case the studs act as additional reflection sites as in FIG. 4A but in a different physical embodiment. FIG. 4C shows a saw tooth texture to create additional reflection sites. With each of the texture methods shown, coatings (FIG. 3) could also be introduced to cover all or portions of a porous or textured surface.

Figure 5:
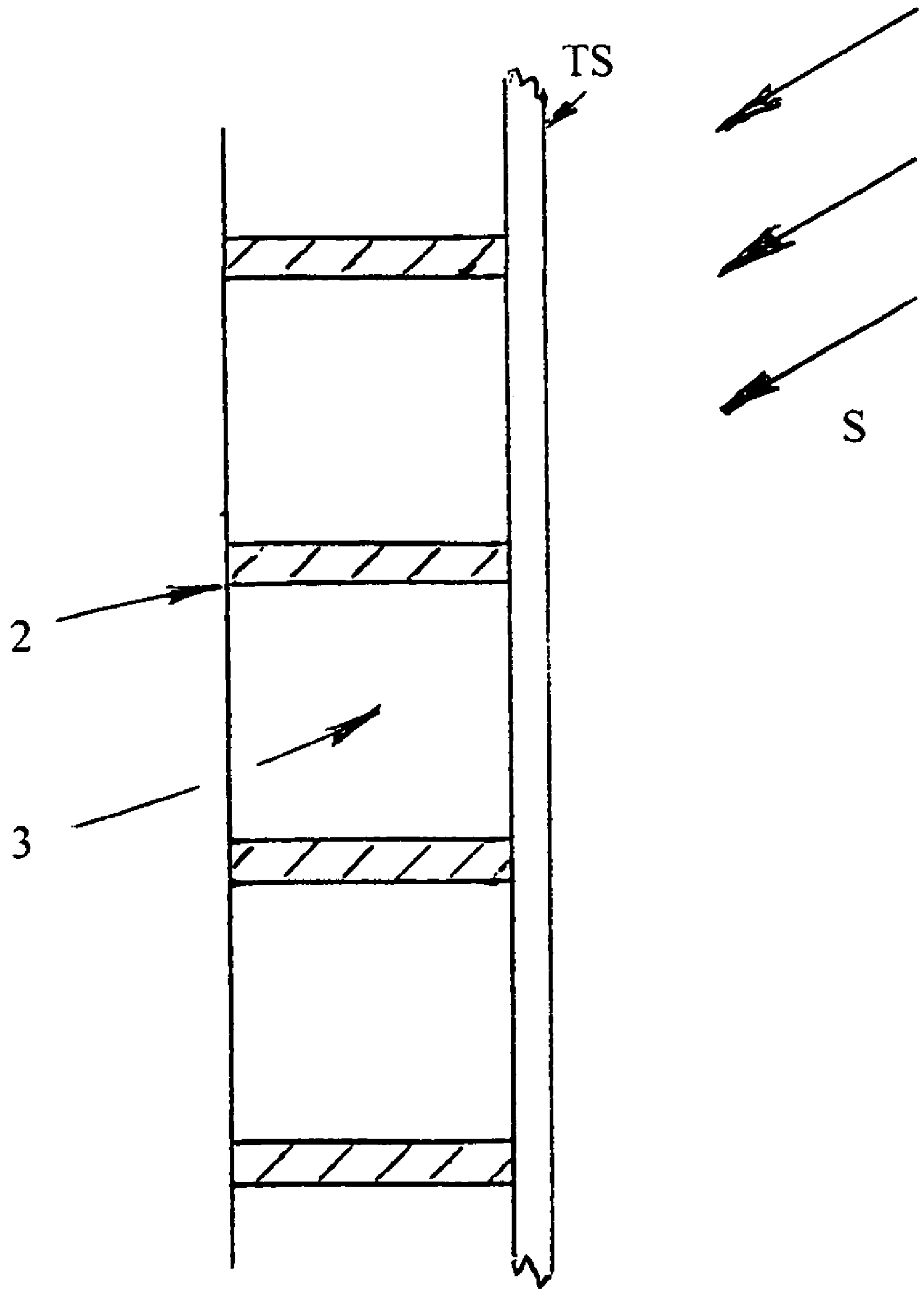
FIG. 5 is a cross section of a grate showing an embodiment with acrylic sheet face where the acrylic helps create a more window-like appearance for the grate to observers outside a building where the grate is mounted external to a window.

7) FIG. 5: Grate with Transparent Exterior Sheet. A sectional view (similar to section 1A-1A from FIG. 2) through a vertically mounted grate. TS is a transparent sheet whose exterior surface is partly reflective. Sunlight (S) approaches from the upper right.

This embodiment is an alternative exterior appearance to more closely resemble a normal window. An uncovered grate appears as a solid at certain angles. At these angles a viewer would normally see subtle reflections from the window. If a transparent sheet is placed outboard of the grate, reflections occur but they may not be noticed if the grate is light in color. A combination with a black grate produces more normal reflections and the black grate is often not noticed from a distance. The black colored grate performs as a better IR block than a white grate but passes less visible light.

Figure 6:
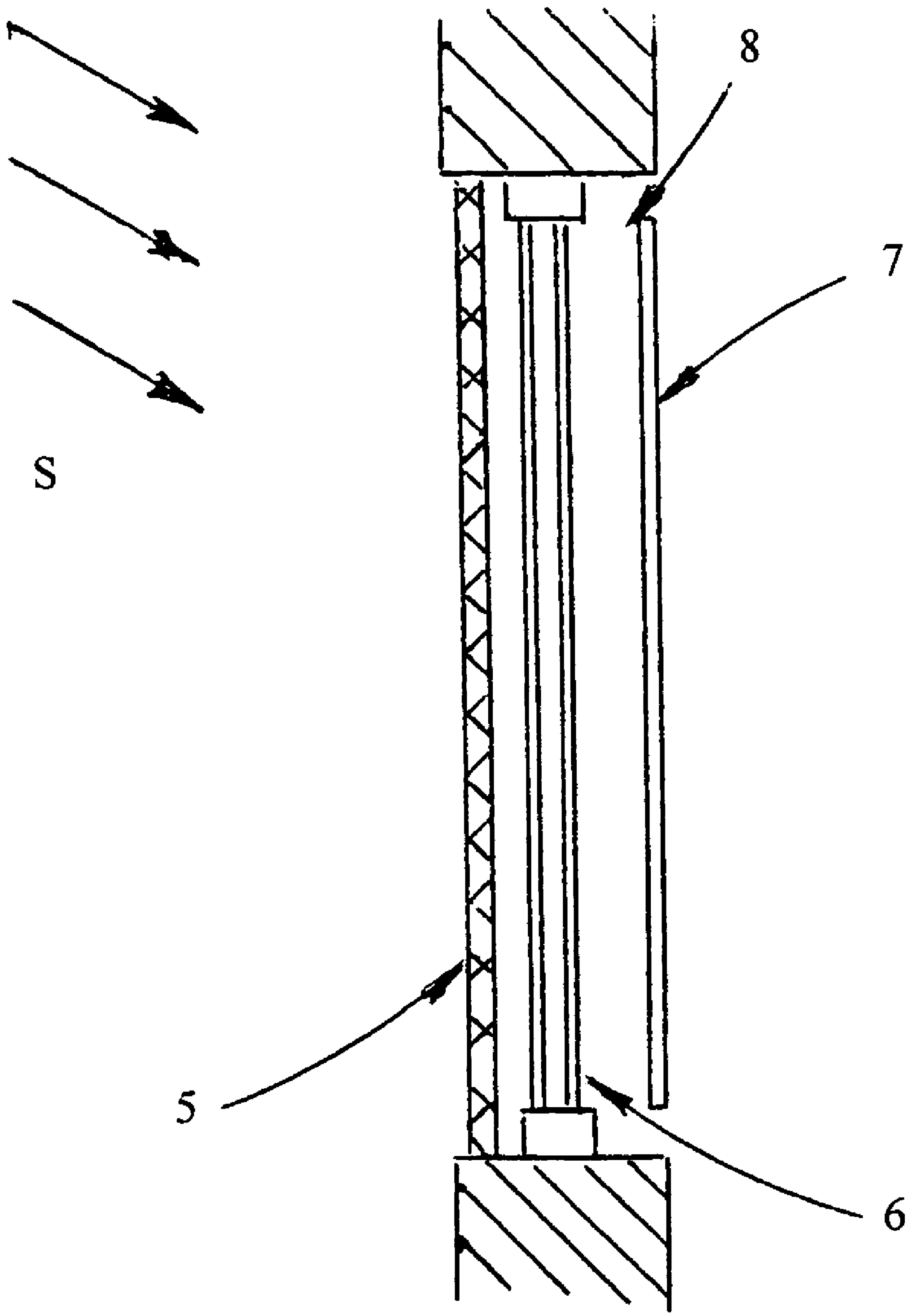
FIG. 6 is an assembly section view showing an embodiment of a grate installed outside a window and in series with a solar film mounted on a screen inside said window wherein the solar film blocks IR from sunlight that has reflected and diffused from said grate and entered through said window.

8) FIG. 6: Grate Combination in Series. A schematic showing an embodiment where a reflective surface is used in series with a grate.

TABLE-US-00003 1 5 is a grate assembly 2 6 is a double pane window 3 7 is an insect screen 4 8 is a reflective surface, in this case a reflective film trapped in place by the insect screen.

The series from outside is comprised of grate (5)—double pane window (6)—reflective film (8)—insect screen (7). Here the reflective surface is not part of the window sash. Instead, a film is held loosely in place by the insect screen frame. The reflective surface is selected to reflect IR. IR in sunlight (S) passing the grate encounters the reflective surface where some is absorbed, some passed to the interior, and some reflected back outside through the panes and grate. The net effect is additional shielding from IR. The cooling benefit is offset by less visible light and increased cost.

The invention claimed is:

1. An energy saving window cover system for controlling impinging sunlight on a windowpane mounted in a window sash in a surrounding structure at an angle determined by the position of the sun with respect to the horizon, the cover system comprising:

a frame mounted exterior to said window sash of said windowpane;

a grate removably mounted within said frame exterior to and substantially parallel with said windowpane, said grate comprising vertical and horizontal walls intersecting one another so to form a plurality of contiguous cells in a single plane, each cell having cell wall surfaces, wherein said cell wall surfaces are working surfaces which absorb, reflect, or diffuse impinging sunlight, said contiguous cells having a depth;

wherein the horizontal and vertical walls of the grate are oriented at an angle with respect to the position of the sun to form a functional angle in which direct rays from the sun entering said grate reach said depth of said grate but not beyond said depth of said grate; said grate at said functional angle or greater passes indirect light and diffused light through said window pane; said grate at less than said functional angle passes direct sunlight, indirect light, and diffused light;

said grate is formed as a single, integral structure, said integral structure configured to maintain a shape while resisting wind, said grate capable of being installed in combination with other grates of the same makeup to form a grate of a different size or depth, said grate capable of transferring absorbed heat to adjacent surroundings;

said contiguous cells of said grate form a grate with open areas which provides a viewing area through said grate and said windowpane;

said grate cell depth, said cell wall surfaces, and said position of the sun with respect to said grate enable the window cover system to provide a shadow pattern and to absorb, diffuse, or reflect infrared radiation, reducing the amount of infrared heating entering through said windowpane.

2. The energy saving window cover system as in claim 1, wherein said cell wall surfaces are coated to improve the selectivity of light wavelengths absorbed or diffused.

3. The energy saving window cover system as in claim 1, wherein said cell wall surfaces are textured or porous to improve the selectivity of light wavelengths absorbed or diffused.

4. The energy saving window cover system as in claim 1, wherein a reflective surface is installed inside said window sash but is not attached to said windowpane, said reflective surface reflects infrared energy back through said windowpane and said grate to the outside, said reflective surface capable of being removed and stored.

5. The energy saving window cover system as in claim 1, wherein an exterior surface of said grate is covered by a transparent, reflective sheet parallel to said single plane, said sheet made of a thin, lightweight plastic constrained by said frame and abutting said grate; said sheet capable of passing sunlight and indirect light to said grate and reflecting visible light to create images on an exterior surface thereof.

* * * * *